US012592208B2

(12) United States Patent
Hara et al.

(10) Patent No.: US 12,592,208 B2
(45) Date of Patent: Mar. 31, 2026

(54) DISPLAY DEVICE

(71) Applicant: Sharp Display Technology Corporation, Kameyama City (JP)

(72) Inventors: Kengo Hara, Kameyama City (JP); Tohru Daitoh, Kameyama City (JP); Yoshihito Hara, Kameyama City (JP); Jun Nishimura, Kameyama City (JP); Yohei Takeuchi, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/913,037

(22) Filed: Oct. 11, 2024

(65) Prior Publication Data

US 2025/0149007 A1 May 8, 2025

(30) Foreign Application Priority Data

Nov. 6, 2023 (JP) ................................. 2023-189323

(51) Int. Cl.
*G09G 3/36* (2006.01)
*G06F 3/041* (2006.01)
*G06F 3/044* (2006.01)

(52) U.S. Cl.
CPC ......... *G09G 3/3677* (2013.01); *G06F 3/0412* (2013.01); *G09G 2310/0286* (2013.01); *G09G 2310/08* (2013.01)

(58) Field of Classification Search
CPC ... G06F 3/0412; G06F 3/0446; G09G 3/3677; G09G 2310/0286; G09G 2310/08
See application file for complete search history.

(56) References Cited

U.S. PATENT DOCUMENTS

2012/0218245 A1 8/2012 Morii et al.
2019/0251921 A1* 8/2019 Ono ......................... G09G 3/36

FOREIGN PATENT DOCUMENTS

JP 2015-109315 A 6/2015
WO 2011/055584 A1 5/2011

* cited by examiner

*Primary Examiner* — Julie Anne Watko
(74) *Attorney, Agent, or Firm* — ScienBiziP, P.C.

(57) ABSTRACT

A display device includes: a display panel including a HIGH power supply line and a LOW power supply line; and a scan signal line drive circuit including a unit circuit, wherein the unit circuit includes: a SET terminal; a RESET terminal; an output terminal; a first thin film transistor; a second thin film transistor including a second semiconductor layer, a second gate electrode, a second source electrode, and a second drain electrode, the second gate electrode being electrically connected to the SET terminal, one of the second source electrode and the second drain electrode being electrically connected to an internal node; and a third thin film transistor, the second gate electrode is an upper gate electrode, another one of the second source electrode and the second drain electrode is electrically connected to the HIGH power supply line, and the second thin film transistor further includes a lower gate electrode.

6 Claims, 13 Drawing Sheets

COMPARATIVE EXAMPLE 1

DISPLAY DEVICE

FIELD OF THE INVENTION

The present invention relates to display devices.

BACKGROUND OF THE INVENTION

Active matrix substrates used in, for example, liquid crystal display devices and organic electroluminescence (EL) display devices has: a display area where there are provided a plurality of pixels; and a non-display area (sometimes referred to as a "frame area") provided around the display area. Each pixel in the display area includes a thin film transistor (hereinafter, a "TFT"). The TFT provided in each pixel has been popularly, for example, a TFT including an amorphous silicon film as an active layer (hereinafter, an "amorphous silicon TFT") or a TFT including a polycrystalline silicon film as an active layer (hereinafter, a "polycrystalline silicon TFT").

It is proposed to use an oxide semiconductor, in place of amorphous silicon or polycrystalline silicon, as a material for the active layer in the TFT. Such a TFT is called an "oxide semiconductor TFT." Oxide semiconductors have a higher mobility than amorphous silicon. Therefore, the oxide semiconductor TFT can operate at a higher speed than the amorphous silicon TFT.

TFT structures are roughly classified into bottom-gate structures and top-gate structures. Currently, although a bottom-gate structure is often employed in an oxide semiconductor TFT, use of a top-gate structure is also proposed (e.g., Patent Literature 1). In the top-gate structure, the gate insulating layer can be made as so thin to achieve high current supply capability.

A peripheral circuit including TFTs is in some cases formed monolithically (integrally) in the non-display area of an active matrix substrate. The monolithic formation of a peripheral circuit enables, for example, narrowing down the non-display area (narrowing down the frame) and reducing cost by simplifying the mounting process. As an example, in the non-display area, a gate driver circuit may be monolithically formed, and a source driver circuit may be mounted by a COG (chip on glass) technique. Monolithically formed gate driver circuits are called GDM (gate driver monolithic) circuits. Patent Literature 2 discloses a liquid crystal display device in which a GDM circuit is formed on an active matrix substrate.

Throughout the present specification, the TFT in each pixel in the display area is referred to as the "pixel TFT." Additionally, the TFT in the peripheral circuit provided in the non-display area is referred to as the "peripheral circuit TFT." When the pixel TFTs are oxide semiconductor TFTs, the peripheral circuit TFTs are also preferably oxide semiconductor TFTs from the manufacturing point of view.

Meanwhile, display devices including a touch sensor (called "touch panels") have been broadly used in, for example, smartphones and tablet computers. Touch sensors operate by various schemes such as resistive film schemes, electrostatic capacity schemes, and optical schemes.

Display devices including a touch sensor (hereinafter, "touch panels") are roughly classified into display devices with an external touch sensor ("external types") and display devices with a built-in touch sensor ("built-in types"). The built-in-type touch panel is advantageous over the external-type touch panel, for example, in the reduction of its thickness and weight and advantageously allows for increased light transmittance.

The built-in-type touch panel comes in "on-cell types" and "in-cell types." The "cell" in this context refers to the display panel. In-cell-type touch panels include a layer that provides a touch sensor function inside the display panel. On-cell-type touch panels include a layer that provides a touch sensor function between the display panel and a polarizer disposed on the viewer side of the display panel.

CITATION LIST

Patent Literature

Patent Literature 1: Japanese Unexamined Patent Application Publication No. 2015-109315
Patent Literature 2: PCT International Application Publication No. WO2011/055584

SUMMARY OF THE INVENTION

Problems to be Solved by the Invention

The in-cell-type touch panel theoretically can provide the thinnest and most lightweight touch panel. However, if the in-cell-type touch panel includes formed therein a GDM circuit including oxide semiconductor TFTs, various problems will entail including those detailed later.

The present invention, in an embodiment thereof, has been made in view of the problems and has an object to provide a display device that includes a GDM circuit including oxide semiconductor TFTs and that can be suitably used as an in-cell-type touch panel.

Solution to the Problems

The present specification discloses display devices described in the following entries.
Entry 1
  A display device including:
  a display panel including a plurality of scan signal lines; and
  a scan signal line drive circuit configured to drive the plurality of scan signal lines, wherein
  the scan signal line drive circuit can alternately switch, in one vertical scan period, between a drive period in which the plurality of scan signal lines are sequentially turned into a selected state and a non-drive period in which the plurality of scan signal lines are not driven, wherein
  the display panel further includes a HIGH power supply line and a LOW power supply line,
  the scan signal line drive circuit includes a shift register circuit including a plurality of stages,
  a unit circuit in each of the plurality of stages includes:
    a clock terminal to which a clock signal is inputted;
    a SET terminal to which a SET signal is inputted;
    a RESET terminal to which a RESET signal is inputted;
    an output terminal electrically connected to a corresponding one of the plurality of scan signal lines to output a scan signal;
    a first thin film transistor including a first semiconductor layer, a first gate electrode, a first source electrode, and a first drain electrode, the first gate electrode being electrically connected to an internal node, one of the first source electrode and the first drain electrode being electrically connected to the clock terminal, another one of the first source electrode and the first drain electrode being electrically connected to the output terminal;

a second thin film transistor including a second semiconductor layer, a second gate electrode, a second source electrode, and a second drain electrode, the second gate electrode being electrically connected to the SET terminal, one of the second source electrode and the second drain electrode being electrically connected to the internal node; and a third thin film transistor including a third semiconductor layer, a third gate electrode, a third source electrode, and a third drain electrode, the third gate electrode being electrically connected to the RESET terminal, one of the third source electrode and the third drain electrode being electrically connected to the internal node, the second gate electrode of the second thin film transistor is an upper gate electrode disposed above the second semiconductor layer via a gate insulating layer, another one of the second source electrode and the second drain electrode of the second thin film transistor is electrically connected to the HIGH power supply line, and the second thin film transistor further includes a lower gate electrode disposed below the second semiconductor layer, facing a channel region of the second semiconductor layer across a lower insulating layer, and electrically connected to the LOW power supply line.

Entry 2

The display device of entry 1, wherein the unit circuit further includes a capacitor including a pair of electrodes, one of the pair of electrodes is electrically connected to the internal node, and another one of the pair of electrodes is electrically connected to the output terminal.

Entry 3

The display device of entry 1 or 2, wherein a control signal is applied to another one of the third source electrode and the third drain electrode of the third thin film transistor, the control signal having a first electrical potential lower than a threshold voltage of the first thin film transistor in the drive period and having a second electrical potential higher than the first electrical potential in at least a part of the non-drive period.

Entry 4

The display device of any of entries 1 to 3, wherein the display panel further includes:

a plurality of electrodes for touch sensor use to which mutually different signals can be applied; and a plurality of wires for touch sensor use each electrically connected to a corresponding one of the plurality of electrodes, and a touch sensor is driven in the non-drive period.

Entry 5

The display device of any of entries 1 to 4, wherein the display panel includes an active matrix substrate including the plurality of scan signal lines, and the scan signal line drive circuit is formed monolithically on the active matrix substrate.

Entry 6

The display device of any of entries 1 to 5, wherein each of the first semiconductor layer, the second semiconductor layer, and the third semiconductor layer is an oxide semiconductor layer.

Entry 7

The display device of entry 6, wherein the oxide semiconductor layer contains an In—Ga—Zn—O-based semiconductor.

Advantageous Effects of the Invention

The present invention, in an embodiment thereof, can provide a display device that includes a GDM circuit including oxide semiconductor TFTs and that can be suitably used as an in-cell-type touch panel.

DESCRIPTION OF EMBODIMENTS

Figure 1:
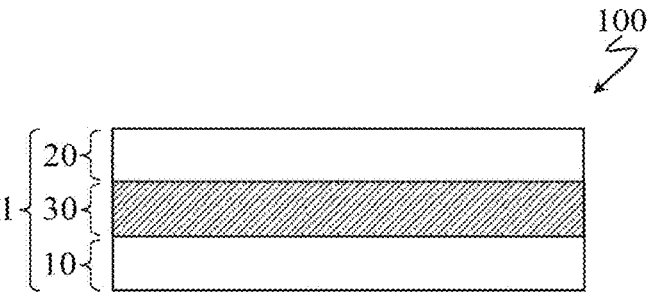
FIG. 1 is a schematic cross-sectional view of a liquid crystal display device 100 in accordance with an embodiment of the present invention.
Figure 2:
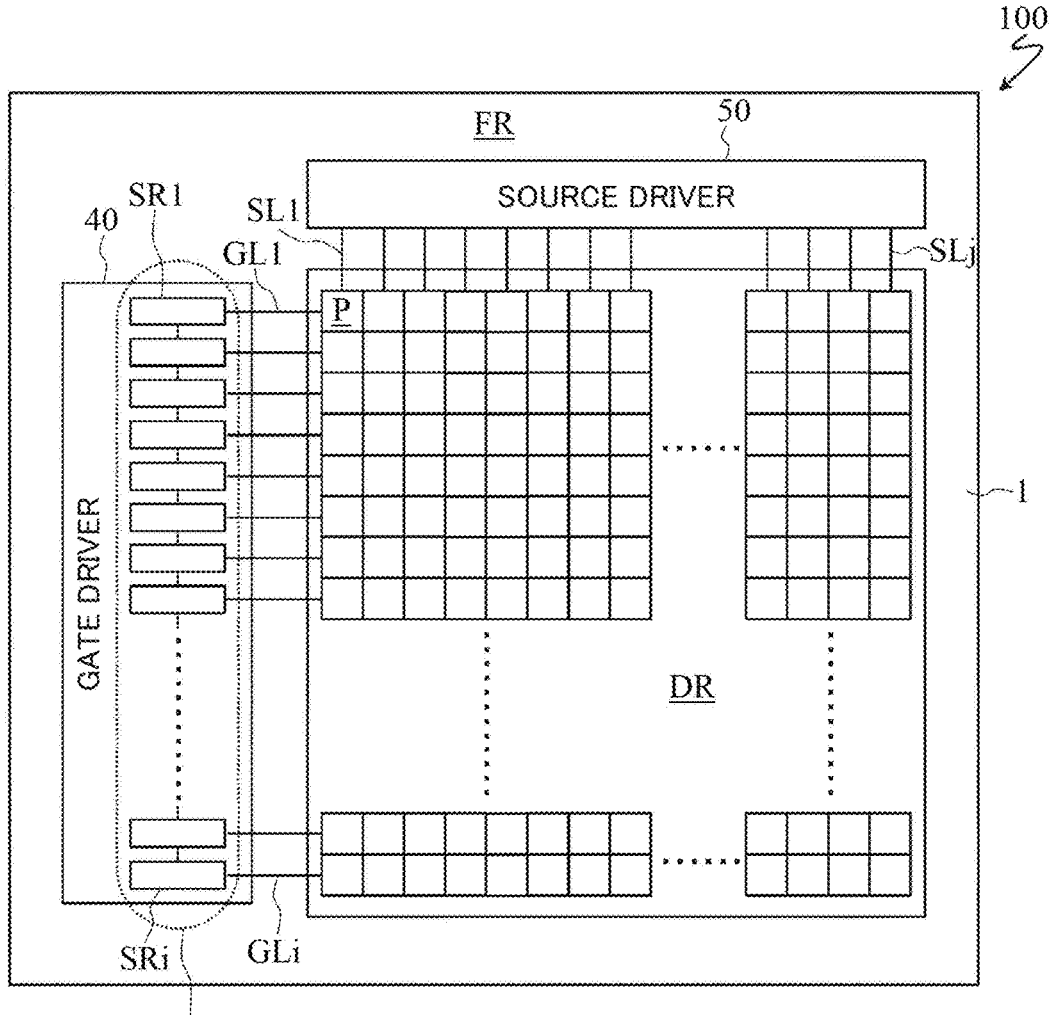
FIG. 2 is a schematic plan view of the liquid crystal display device 100.
Figure 3:
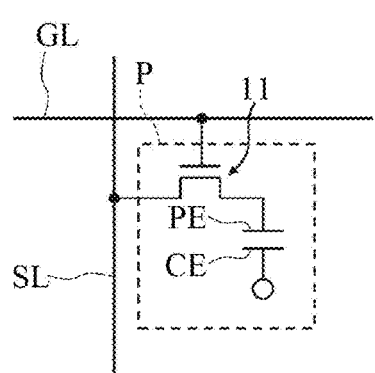
FIG. 3 is an equivalent circuit diagram of one of pixels P in the liquid crystal display device 100.

The following will describe embodiments of the present invention with reference to drawings. Note that the following description takes a liquid crystal display device as an example of a display device in accordance with an embodiment of the present invention, but the display device in accordance with an embodiment of the present invention is not necessarily limited to a liquid crystal display device. In addition, thin film transistors in the following description are n-type TFTs, and an electrical contact relationship in a case where n-type TFTs are used will be described. Note also that the source-drain electrical contact of a p-type TFT is opposite the source-drain electrical contact of an n-type TFT.
Schematic Structure of Liquid Crystal Display Device First, a schematic description is given of the structure of a liquid crystal display device 100 in accordance with an embodiment of the present invention with reference to FIGS. 1, 2, and 3. The liquid crystal display device 100 is an in-cell-type touch panel. FIGS. 1 and 2 are a schematic cross-sectional view and a schematic plan view of the liquid crystal display device 100 respectively. FIG. 3 is an equivalent circuit diagram of one of pixels P in the liquid crystal display device 100.

The liquid crystal display device 100 includes a display panel 1 as shown in FIG. 1. The display panel 1 includes: an active matrix substrate (hereinafter, a "TFT substrate") 10; an opposite substrate (sometimes referred to as a "color filter substrate") 20 disposed opposite the TFT substrate 10; and a liquid crystal layer 30 disposed between the TFT substrate 10 and the opposite substrate 20.

The liquid crystal display device 100, as shown in FIG. 2, includes a display area DR and a non-display area (which may be referred to as a "frame area") FR. The display area DR is defined by the plurality of pixels P. The plurality of pixels P are arranged in a matrix of a plurality of rows and a plurality of columns. The non-display area FR is positioned along the periphery of the display area DR and does not contribute to producing displays.

The display panel 1 (more specifically, the TFT substrate 10) in the liquid crystal display device 100 includes a plurality of gate bus lines (scan signal lines) (i gate bus lines) GL1 to GLi and a plurality of source bus lines (video signal lines) (j source bus lines) SL1 to SLj. The gate bus lines GL1 to GLi (which may be collectively referred to as the "gate bus lines GL") extend in the row direction, whereas the source bus lines SL1 to SLj (which may be collectively referred to as the "source bus lines SL") extend in the column direction (which is substantially perpendicular to the row direction).

Each pixel P, as shown in FIG. 3, includes a thin film transistor (pixel TFT) 11 and a pixel electrode PE. The pixel TFT 11 is fed with a scan signal (gate signal) from a corresponding one of the gate bus lines GL and with a display signal (source signal) from a corresponding one of the source bus lines SL. The pixel TFT 11 is an oxide semiconductor TFT including an oxide semiconductor layer as an active layer. The pixel electrode PE is electrically connected to the pixel TFT 11. There is provided a common electrode CE opposite the pixel electrode PE.

The liquid crystal display device 100 further includes a gate driver (scan signal line drive circuit) 40 for driving the gate bus lines GL1 to GLi and a source driver (video signal line drive circuit) 50 for driving the source bus lines SL1 to SLj. The gate driver 40 and the source driver 50 are disposed in the non-display area FR.

The gate driver 40 sequentially turns the plurality of gate bus lines GL1 to GLi into a selected state (a state where a HIGH scan signal is applied). The gate driver 40 includes a shift register circuit 41 including a plurality of stages (i stages in this example). The plurality of stages are arranged in the column direction. Each of the plurality of stages includes a unit circuit SR. In other words, the shift register circuit 41 includes a plurality of unit circuits SR1 to SRi (i unit circuits in this example). In this example, the gate driver 40 is formed monolithically on an active matrix substrate 10. In other words, the gate driver 40 is a GDM circuit.

Figure 4:
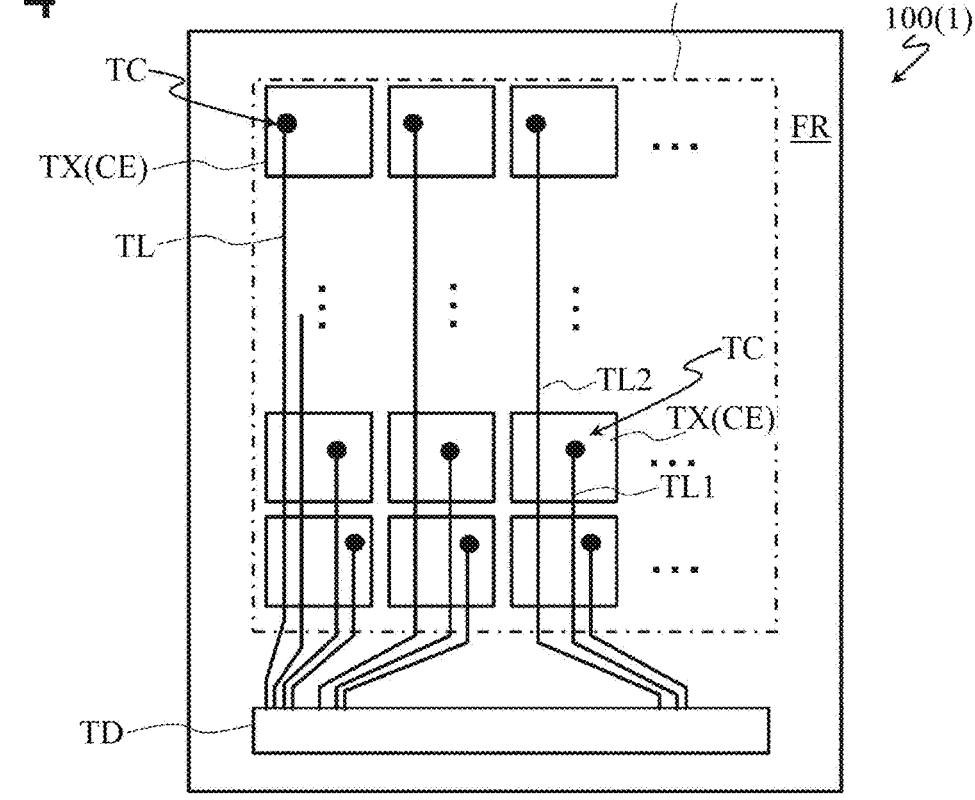
FIG. 4 is a plan view illustrating a positional relationship between touch sensor electrodes TX and touch wires TL in the liquid crystal display device 100.

As described above, the liquid crystal display device 100 is an in-cell-type touch panel. Referring to FIG. 4, a description is given of, for example, an arrangement of electrodes and wires for a touch sensor.

Referring to FIG. 4, in the display area DR, the common electrode CE is divided into a plurality of segments TX. The plurality of segments TX can function as electrodes for a touch sensor (hereinafter, "touch sensor electrodes") because mutually different signals (voltages) can be applied to the plurality of segments TX. In other words, the display panel 1 includes a plurality of touch sensor electrodes TX. Each touch sensor electrode TX is provided correspondingly to two or more of the pixels P.

The display panel 1 further includes a plurality of wires for the touch sensor (hereinafter, "touch wires") TL. Each touch wire TL is electrically connected to a corresponding one of the plurality of touch sensor electrodes TX. The touch sensor electrodes TX and the touch wires TL are connected at connecting portions TC termed "touch wire contact sections." In the example shown, the touch wires TL extend in the column direction (the same directions as the source bus lines SL). Some of the touch wires TL extend up to the corresponding touch sensor electrode TX by traversing at least another one of the touch sensor electrodes TX.

Focusing on one of the touch sensor electrodes TX, one of the touch wires (first touch wire TL1) that supplies a signal to that particular touch sensor electrode TX extends up to the touch wire contact section TC, and another one of the touch wires (second touch wire TL2) that supplies a signal to another one of the touch sensor electrodes TX extends traversing the particular touch sensor electrode TX. Note that depending on the location of the touch sensor electrode TX, two or more of the touch wires TL may be provided extending by traversing this touch sensor electrode TX, and none of the touch wires TL may be provided traversing the touch sensor electrode TX.

The touch wires TL are connected to a touch drive unit TD provided in the non-display area FR. The touch drive unit TD is structured, for example, to switch, by time division, between a display mode in which the plurality of touch sensor electrodes TX function as the common electrode CE and a touch detection mode in which the plurality of touch sensor electrodes TX function as the touch sensor electrodes TX. The touch drive unit TD, for example, in the display mode, applies a common signal to the touch sensor electrodes TX (common electrode CE) via the touch wires TL. Meanwhile, in the touch detection mode, the touch drive unit TD applies a touch drive signal to the touch sensor electrodes TX via the touch wires TL.

Figure 5:
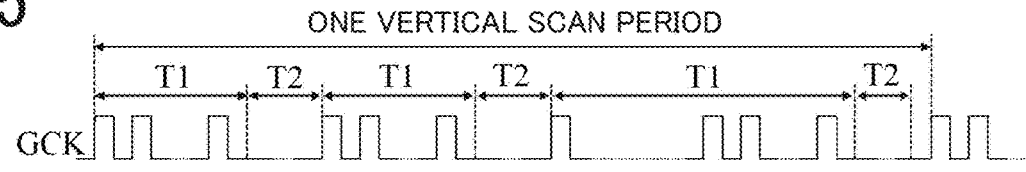
FIG. 5 is a timing chart for an exemplary gate clock signal GCK in one vertical scan period.

FIG. 5 is a timing chart for an exemplary gate clock signal GCK in one vertical scan period. Referring to FIG. 5, the gate driver 40 can alternately switch, in one vertical scan period, between a drive period T1 in which the gate bus lines GL1 to GLi are sequentially turned into the selected state and a non-drive period T2 in which the gate bus lines GL1 to GLi are not driven (i.e., the gate clock signal GCK remains LOW). The touch sensor is driven in the non-drive period T2.

Structure of Shift Register Circuit in Gate Driver

Figure 6:
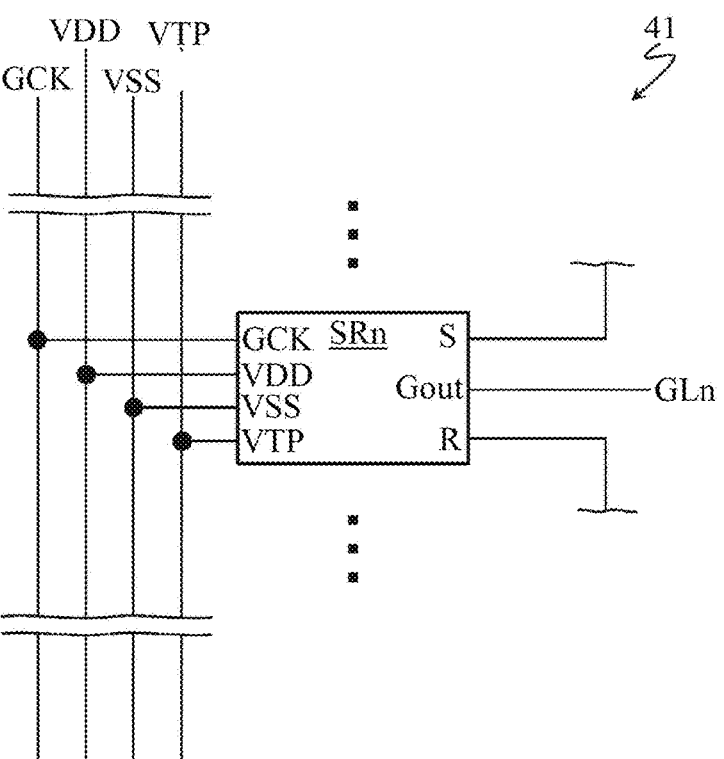
FIG. 6 is a block diagram of a structure of a shift register circuit 41 included in a gate driver 40.

Referring to FIG. 6, a description is given of a structure of the shift register circuit 41 in the gate driver 40. FIG. 6 is a block diagram of a structure of the shift register circuit 41. FIG. 6 shows, as an example, a unit circuit SRn in an n-th stage for supplying a scan signal to the gate bus line GLn in the n-th row, among the plurality of unit circuits SR1 to SRi in the shift register circuit 41. As shown as an example in FIG. 6, each unit circuit SR includes: a clock terminal to which the gate clock signal GCK is inputted; a SET terminal to which a SET signal S is inputted; and a RESET terminal to which a RESET signal R is inputted. Each unit circuit SR further includes: a HIGH power supply terminal to which a HIGH power supply potential VDD is inputted; a LOW power supply terminal to which a LOW power supply potential VSS is inputted; a control terminal to which a control signal VTP is inputted; and an output terminal from which a scan signal Gout is outputted. The display panel 1 includes a wire for supplying the HIGH power supply potential VDD (hereinafter, the "HIGH power supply line VDD") and a wire for supplying the LOW power supply potential VSS (hereinafter, the "LOW power supply line VSS").

Each unit circuit SR is fed with the gate clock signal GCK. The gate clock signal GCK may be, for example, a four-phase, a six-phase, an eight-phase or another multi-phase clock signal. Each unit circuit SR is fed also with either a gate start pulse signal or the scan signal Gout outputted from another stage as the SET signal S and with the scan signal Gout outputted from another stage as the RESET signal R. Each unit circuit SR is fed also with the control signal VTP. The control signal VTP is LOW in the drive period T1 and HIGH in at least a part of the non-drive period T2 (typically throughout the non-drive period T2). Each unit circuit SR outputs the scan signal Gout.

Structure of Unit Circuit

Figure 7:
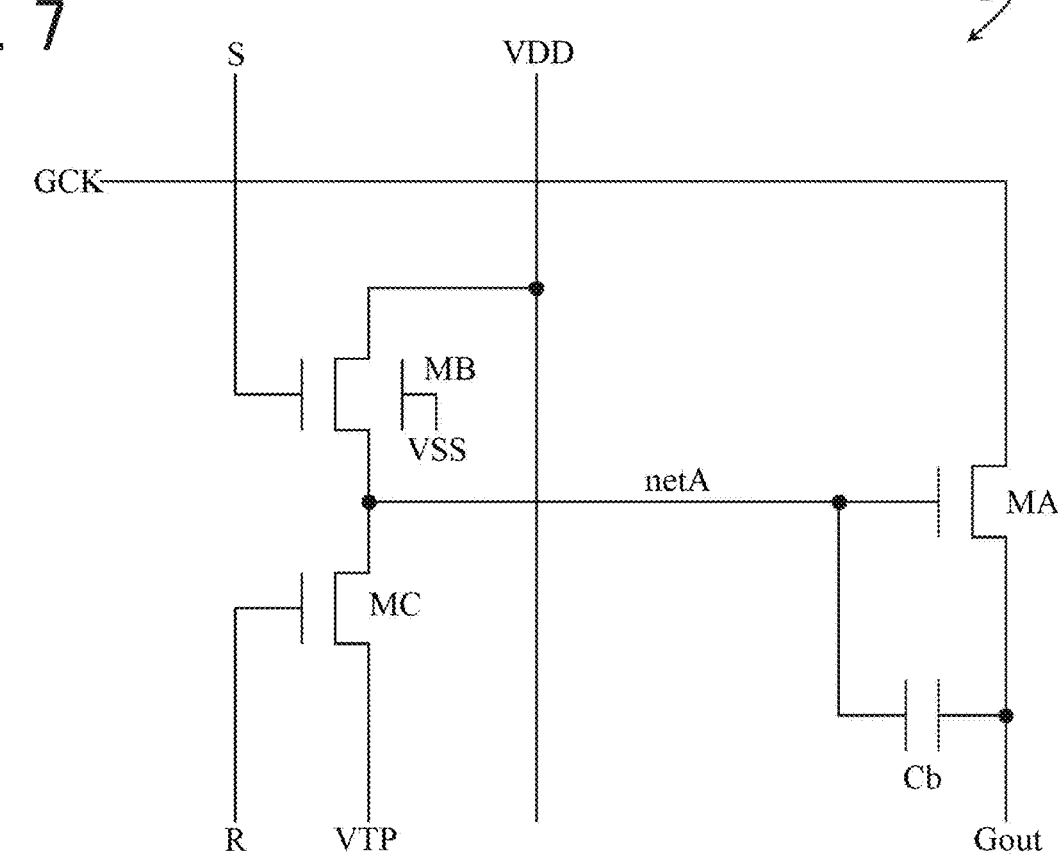
FIG. 7 is a circuit diagram of an exemplary structure of a unit circuit SR (exemplary structure of each stage in the shift register circuit 41).

FIG. 7 is a circuit diagram of an exemplary structure of the unit circuit SR (exemplary structure of each stage in the shift register circuit 41). Referring to FIG. 7, the unit circuit SR includes: a first thin film transistor (hereinafter, simply a "first transistor") MA; a second thin film transistor (hereinafter, simply a "second transistor") MB; a third thin film transistor (hereinafter, simply a "third transistor") MC; and a capacitor Cb.

The first transistor MA functions as an "output transistor" for outputting the scan signal Gout to a corresponding one of the gate bus lines GL. The first transistor MA has the gate electrode thereof electrically connected to an internal node netA. In addition, the first transistor MA has the drain electrode thereof electrically connected to a clock terminal and the source electrode thereof electrically connected the output terminal.

The second transistor MB functions as a "setting transistor" for precharging (stepping up) the internal node netA. The second transistor MB has the gate electrode thereof (the "upper gate electrode" as detailed later) electrically connected to the SET terminal. The second transistor MB has the drain electrode thereof electrically connected to the HIGH power supply terminal (i.e., electrically connected to the HIGH power supply line VDD) and the source electrode thereof electrically connected to the internal node netA.

The third transistor MC functions as a "resetting transistor" for stepping down the internal node netA. The third transistor MC has the gate electrode thereof electrically connected to the RESET terminal. The third transistor MC has the drain electrode thereof electrically connected to the internal node netA and the source electrode thereof electrically connected to the control terminal.

The capacitor Cb retains the voltage of the internal node netA precharged by the second transistor MB. One of the pair of electrodes in the capacitor Cb is electrically connected to the internal node netA, and the other is electrically connected to the output terminal.

Each of the first transistor MA, the second transistor MB, and the third transistor MC includes a semiconductor layer that is an oxide semiconductor layer. In other words, the first transistor MA, the second transistor MB, and the third transistor MC are oxide semiconductor TFTs.

Figure 8:
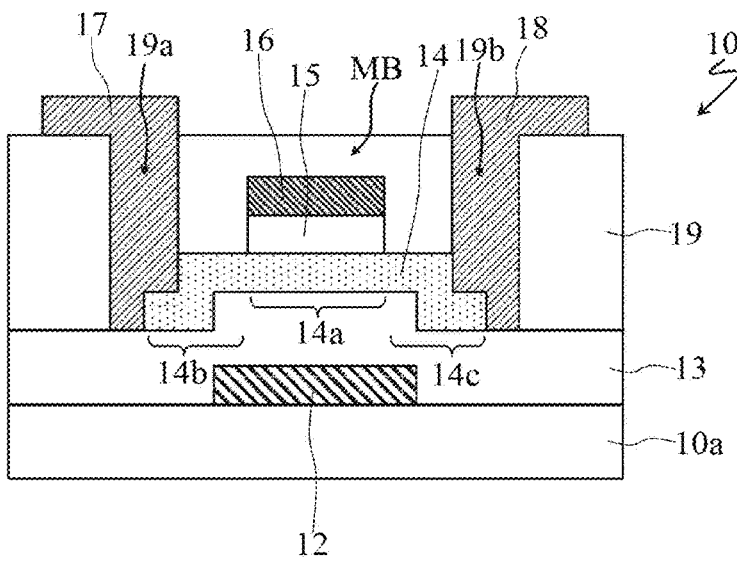
FIG. 8 is a schematic cross-sectional view of a region of a TFT substrate 10 in which there is provided a second transistor MB.

A description is given now of a structure of the second transistor MB. FIG. 8 is a schematic cross-sectional view of a region of the TFT substrate 10 in which the second transistor MB is provided. The TFT substrate 10 includes a substrate 10a, a light-blocking layer 12, and the second transistor MB, all in the region shown in FIG. 8.

The substrate 10a is transparent and electrically insulating. The substrate 10a is, for example, a glass substrate or a plastic substrate. The substrate 10a supports, for example, the second transistor MB.

The light-blocking layer 12 is provided on the substrate 10a. The light-blocking layer 12 is made of a light-blocking and electrically conductive material (e.g., metal material). There is provided a lower insulating layer 13 so as to cover the light-blocking layer 12.

The second transistor MB includes: an oxide semiconductor layer 14 on the lower insulating layer 13; a gate insulating layer 15 on the oxide semiconductor layer 14; and a gate electrode 16 facing the oxide semiconductor layer 14 across the gate insulating layer 15. The second transistor MB further includes a source electrode 17 and a drain electrode 18 both electrically connected to the oxide semiconductor layer 14.

The gate electrode 16 is electrically connected to the SET terminal. The gate electrode 16 may be referred to as the "upper gate electrode" in the following description because the gate electrode 16 is disposed above the oxide semiconductor layer 14 via the gate insulating layer 15. The source electrode 17 is electrically connected to the internal node netA. The drain electrode 18 is electrically connected to the HIGH power supply line VDD (i.e., to the HIGH power supply terminal).

On the oxide semiconductor layer 14, the gate insulating layer 15 is provided so as to overlap a part of the oxide semiconductor layer 14 in a plan view.

The oxide semiconductor layer 14 includes: a channel region 14a; and a first low resistance region 14b and a second low resistance region 14c on the respective sides of the channel region 14a. The channel region 14a overlaps the gate insulating layer 15 (and the upper gate electrode 16) in a plan view. The first low resistance region 14b and the second low resistance region 14c do not overlap the gate insulating layer 15 (and the upper gate electrode 16) in a plan view and have a lower specific resistance than the channel region 14a. The first low resistance region 14b is located on a source electrode 17 side of the channel region 14a. The second low resistance region 14c is located on a drain electrode 18 side of the channel region 14a. The first low resistance region 14b and the second low resistance region 14c can be formed by, for example, performing a resistance-reducing process on the oxide semiconductor layer 14 by using the upper gate electrode 16 and the gate insulating layer 15 as a mask.

An upper insulating layer 19 is provided on the oxide semiconductor layer 14, the gate insulating layer 15, and the upper gate electrode 16. The source electrode 17 is provided on the upper insulating layer 19 and inside an opening (source-side opening) 19a formed in the upper insulating layer 19 and is connected to a part of the oxide semiconductor layer 14 (a part of the first low resistance region 14b) inside the source-side opening 19a. Similarly, the drain electrode 18 is provided on the upper insulating layer 19 and inside an opening (drain-side opening) 19b formed in the upper insulating layer 19 and is connected to another part of the oxide semiconductor layer 14 (another part of the second low resistance region 14c) inside the drain-side opening 19b.

The light-blocking layer 12 is disposed below the oxide semiconductor layer 14 and faces the channel region 14a of the oxide semiconductor layer 14 across the lower insulating layer 13. Therefore, the light-blocking layer 12 can function as a "lower gate electrode" of the second transistor MB by being fed with a prescribed electrical potential. In the present embodiment, referring to FIG. 7, the lower gate electrode (light-blocking layer) 12 is electrically connected to the LOW power supply line VSS to be fed with the LOW power supply potential VSS.

Note that the second transistor MB is covered with an interlayer insulating layer (not shown in this example). In the display area DR, the pixel electrode PE and other members are provided on the interlayer insulating layer. The pixel electrode PE is made of a transparent conductive material (e.g., ITO or IZO). When the display mode of the liquid crystal display device 100 is FFS mode (which is a type of in-plane electric field mode), the TFT substrate 10 further includes the common electrode CE facing the pixel electrode PE across a dielectric layer. The common electrode CE is made of a transparent conductive material (e.g., ITO or IZO).

Operation of Unit Circuit

Figure 9:
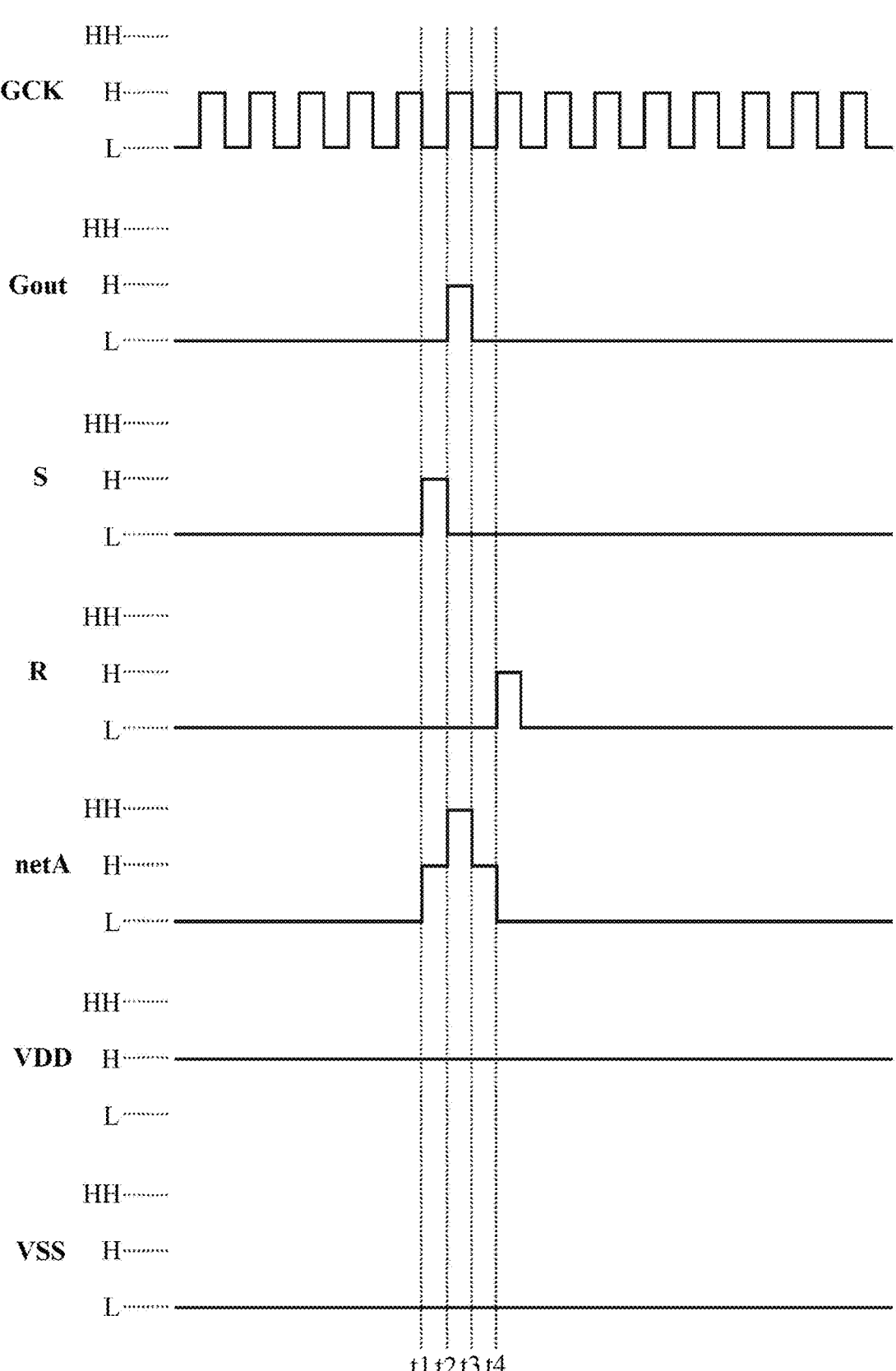
FIG. 9 is a timing chart for an operation of the unit circuit SR.

A description is given of an operation of the unit circuit SR with reference to FIG. 9. FIG. 9 is a timing chart for an operation of the unit circuit SR and shows electrical potentials of the gate clock signal GCK, the scan signal Gout, the SET signal S, the RESET signal R, the internal node netA, the HIGH power supply line VDD, and the LOW power supply line VSS.

Referring to FIG. 9, the electrical potential of the SET signal S, the electrical potential of the internal node netA, and the electrical potential of the scan signal Gout are maintained at LOW before time t1. The SET signal S goes from LOW to HIGH at time t1. Hence, the second transistor MB is turned on, thereby charging the capacitor Cb over the period from time t1 to time t2 and increasing the electrical potential of the internal node netA.

At time t2, the gate clock signal GCK goes HIGH from LOW. Accordingly, the drain electrical potential of the first transistor MA rises. Since the first transistor MA is ON at that time, the electrical potential of the scan signal Gout (the electrical potential of the output terminal) also rises. As the electrical potential of the output terminal rises, the electrical potential of the internal node netA rises further via the capacitor Cb (the internal node netA is boosted). As a result, a larger voltage is applied to the gate electrode of the first transistor MA, and therefore, the HIGH gate clock signal GCK is fed as is to the output terminal via the first transistor MA. Hence, the scan signal Gout goes HIGH. Then, the HIGH state of the scan signal Gout is maintained until time t3. Note that at time t2, the SET signal S goes from HIGH to LOW, which turns off the second transistor MB.

At time t3, the gate clock signal GCK goes from HIGH to LOW. Since the first transistor MA is ON at that time, the electrical potential of the scan signal Gout (the electrical potential of the output terminal) decreases with a decrease in the drain electrical potential (the electrical potential of the clock terminal). This decrease in the electrical potential of the output terminal also reduces the electrical potential of the internal node netA via the capacitor Cb.

At time t4, the RESET signal R goes from LOW to HIGH. Hence, the third transistor MC is turned on, and therefore, the electrical potential of the internal node netA is pulled down to LOW.

Effects

The liquid crystal display device 100 in accordance with the present embodiment can be suitably used as an in-cell-type touch panel owing to the above-described structure of the unit circuit SR in the gate driver 40. Reasons for this are described with reference to the structures of the touch panels in accordance with Comparative Examples 1 and 2.

Figure 10:
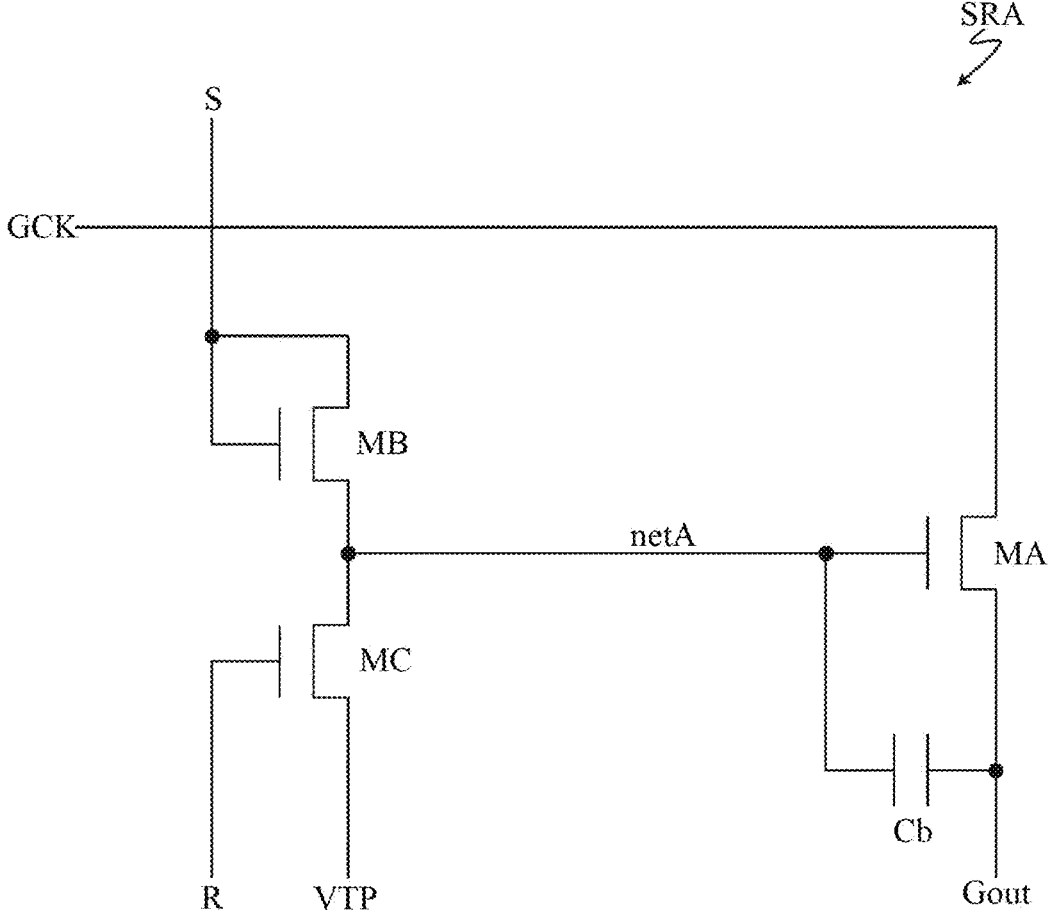
FIG. 10 is a circuit diagram of a structure of a unit circuit SRA for a gate driver in a touch panel in accordance with Comparative Example 1.

FIG. 10 is a circuit diagram of a structure of a unit circuit SRA for a gate driver in a touch panel in accordance with Comparative Example 1 (hereinafter, simply referred to as the "unit circuit in accordance with Comparative Example 1"). Similarly to the unit circuit SR in accordance with the present embodiment, the unit circuit SRA in accordance with Comparative Example 1 includes a first transistor MA that functions as an "output transistor," a second transistor MB that functions as a "setting transistor," a third transistor MC that functions as a "resetting transistor," and a capacitor Cb.

It should be understood however that in the unit circuit SRA in accordance with Comparative Example 1, the drain electrode of the second transistor MB is, together with the gate electrode (upper gate electrode), electrically connected (i.e., diode-connected) to the SET terminal. In addition, in the unit circuit SRA in accordance with Comparative Example 1, the second transistor MB does not include a lower gate electrode to which the LOW power supply potential VSS is fed.

The unit circuit SRA in accordance with Comparative Example 1 can be described as being a simple application of the structure of a unit circuit in a gate driver for a typical liquid crystal display device to an in-cell-type touch panel. The unit circuit SRA in accordance with Comparative Example 1 entails problems including the following problems.

Figure 11:
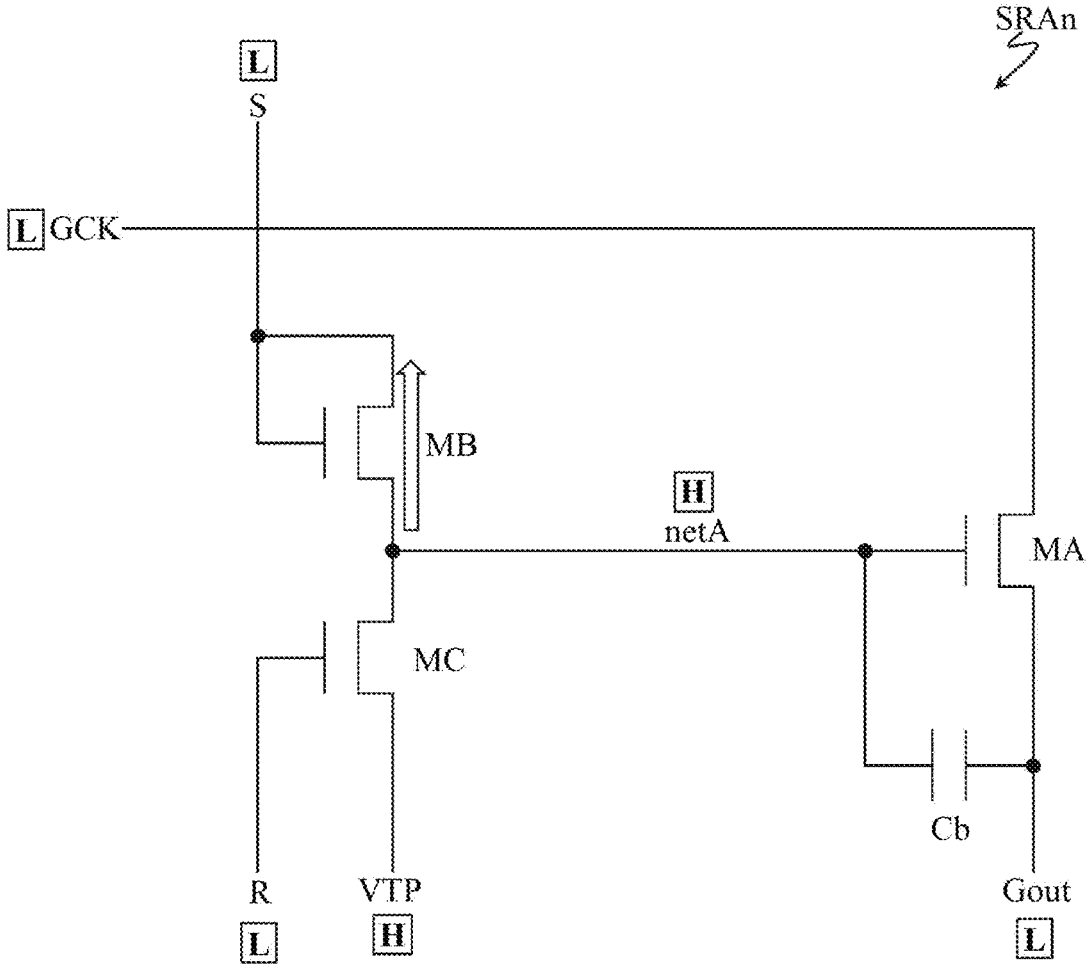
FIG. 11 is a diagram showing the electrical potentials of an internal node netA and each signal in a non-drive period T2 in a unit circuit SRAn in an n-th stage in the touch panel in accordance with Comparative Example 1.

Here, a situation is discussed where after the gate bus lines GL1 to GLn−1 in the first row to the (n−1)-th row are selected in a drive period T1, the touch sensor is driven in the non-drive period T2, and the gate bus line GLn in the n-th row starts to be selected in the next drive period T1. FIG. 11 shows the electrical potentials of the internal node netA and each signal in the non-drive period T2 for a unit circuit SRAn in the n-th stage in the situation. FIG. 11 denotes the HIGH-level electrical potential by "H" and the LOW-level electrical potential by "L."

In the unit circuit SRAn in the n-th stage, since the electrical potentials of the internal node netA and each signal have the relationship shown in FIG. 11, electric charge is withdrawn from the internal node netA (precharged in the immediately preceding drive period T1) in the non-drive period T2. Therefore, after the non-drive period T2 ends, the gate bus line GLn may not be suitably selected in the next drive period T1.

Figure 12:
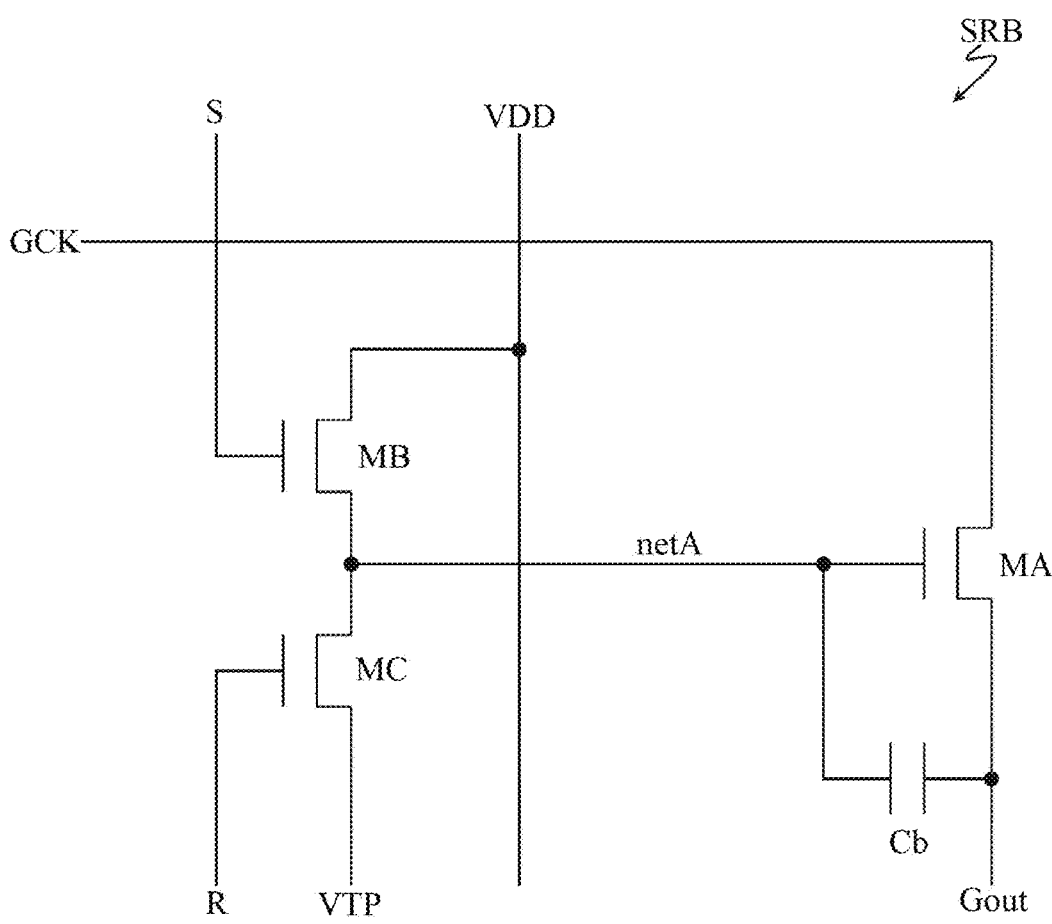
FIG. 12 is a circuit diagram of a structure of a unit circuit SRB for a gate driver in a touch panel in accordance with Comparative Example 2.

FIG. 12 is a circuit diagram of a structure of a unit circuit SRB for a gate driver in a touch panel in accordance with Comparative Example 2 (hereinafter, simply referred to as the "unit circuit in accordance with Comparative Example 2"). The unit circuit SRB in accordance with Comparative Example 2 differs from the unit circuit SRA in accordance with Comparative Example 1 in that the drain electrode of the second transistor MB is electrically connected to the HIGH power supply line VDD.

Figure 13:
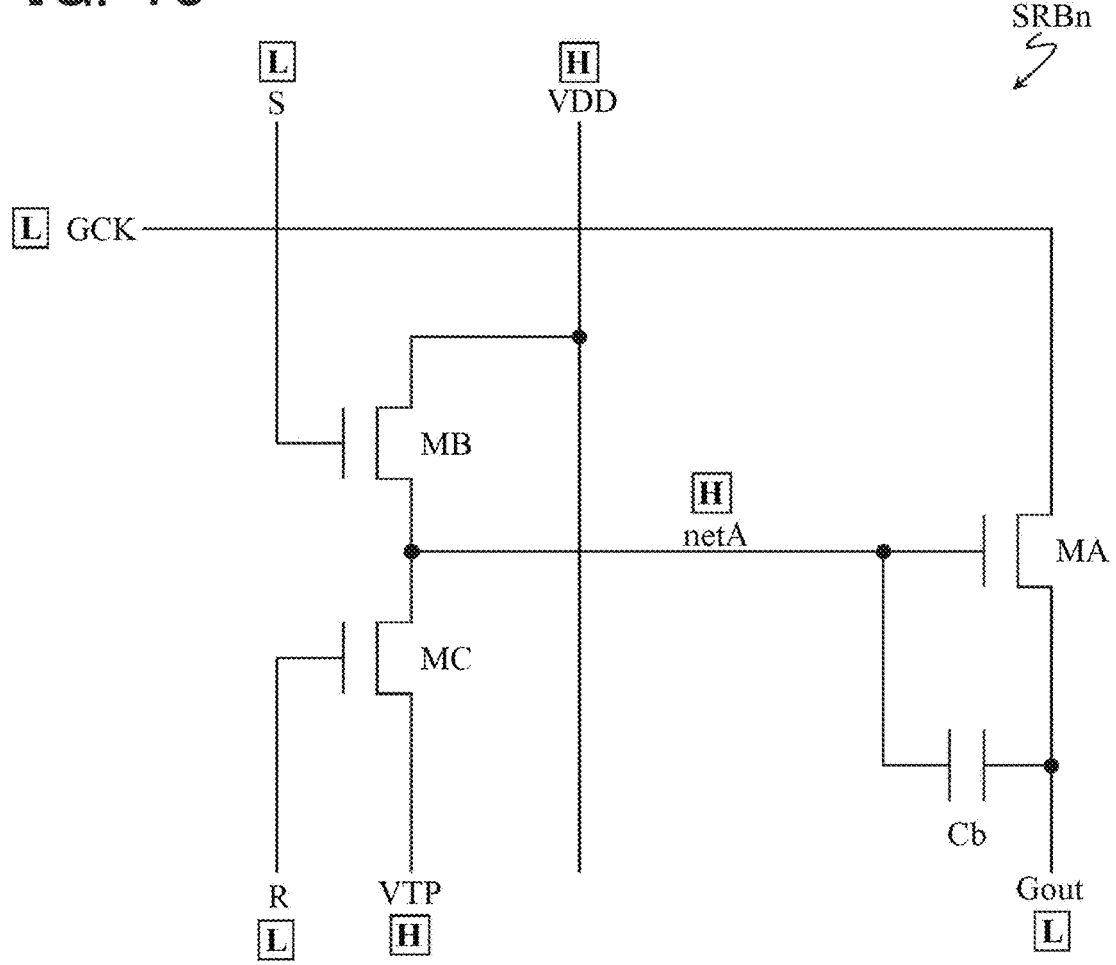
FIG. 13 is a diagram showing the electrical potentials of an internal node netA and each signal in a non-drive period T2 in a unit circuit SRBn in an n-th stage in the touch panel in accordance with Comparative Example 2.

Here, similarly to the unit circuit SRA in accordance with Comparative Example 1, a situation is discussed where after the gate bus lines GL1 to GLn−1 in the first row to the (n−1)-th row are selected in a drive period T1, the touch sensor is driven in the non-drive period T2, and the gate bus line GLn in the n-th row starts to be selected in the next drive period T1. FIG. 13 shows the electrical potentials of the internal node netA and each signal in the non-drive period T2 for a unit circuit SRBn in the n-th stage in the situation.

In the unit circuit SRBn in the n-th stage, since the electrical potentials of the internal node netA and each signal have the relationship shown in FIG. 13, electric charge is prevented from being withdrawn from the internal node netA in the non-drive period T2 because the drain electrode of the second transistor MB is electrically connected to the HIGH power supply line VDD. Therefore, after the non-drive period T2 ends, the gate bus line GLn can be suitably selected in the next drive period T1.

As described here, this electric charge withdrawing problem that occurs in the unit circuit SRA in accordance with Comparative Example 1 can be overcome by electrically connecting the drain electrode of the second transistor MB to the HIGH power supply line VDD as in the unit circuit SRB in accordance with Comparative Example 2. It should be understood however that the inventors of the present invention have further investigated the unit circuit SRB in accordance with Comparative Example 2 and found a new problem that the threshold voltage of the second transistor MB could shift toward the negative end. The following describes reasons for this phenomenon.

Figure 14:
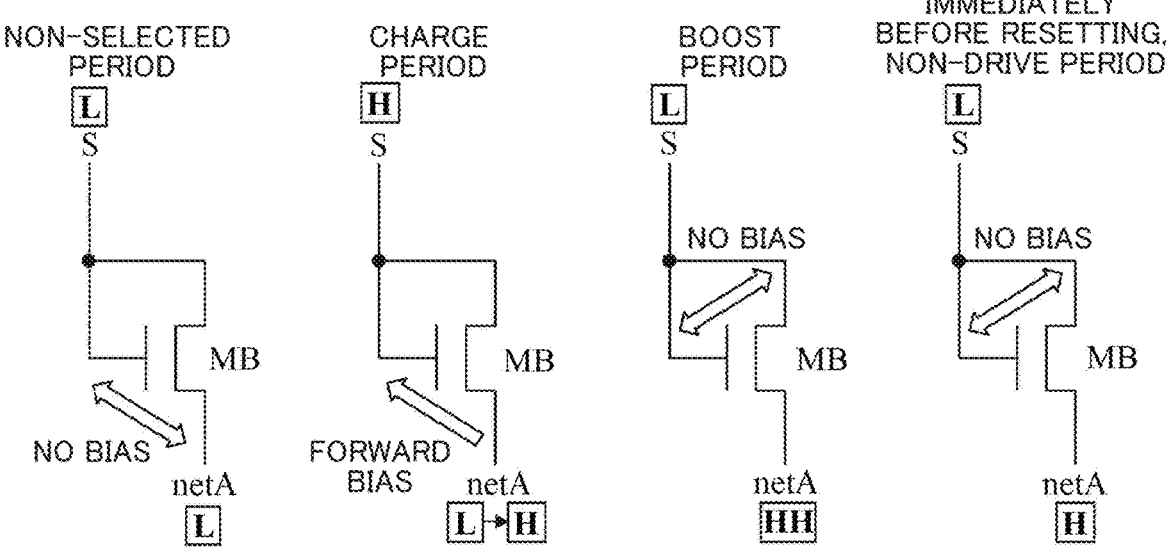
FIG. 14 is a diagram showing a relationship between the electrical potentials of the internal node netA and a SET signal S and the presence/absence of a bias in a non-selected period, in a charge (precharge) period, in a boost period, immediately before resetting, and in the non-drive period T2 for a second transistor MB in a unit circuit SRA in accordance with Comparative Example 1.

FIG. 14 is a diagram showing a relationship between the electrical potentials of the internal node netA and the SET signal S and the presence/absence of a bias in a non-selected period, in a charge (precharge) period, in a boost period, immediately before resetting, and in the non-drive period T2 for the second transistor MB in the unit circuit SRA in accordance with Comparative Example 1.

In the unit circuit SRA in accordance with Comparative Example 1, as shown in FIG. 14, the second transistor MB is placed under no bias in the non-selected period, in the boost period, immediately before resetting, and in the non-drive period T2 and is under a forward bias in the charge period.

Figure 15:
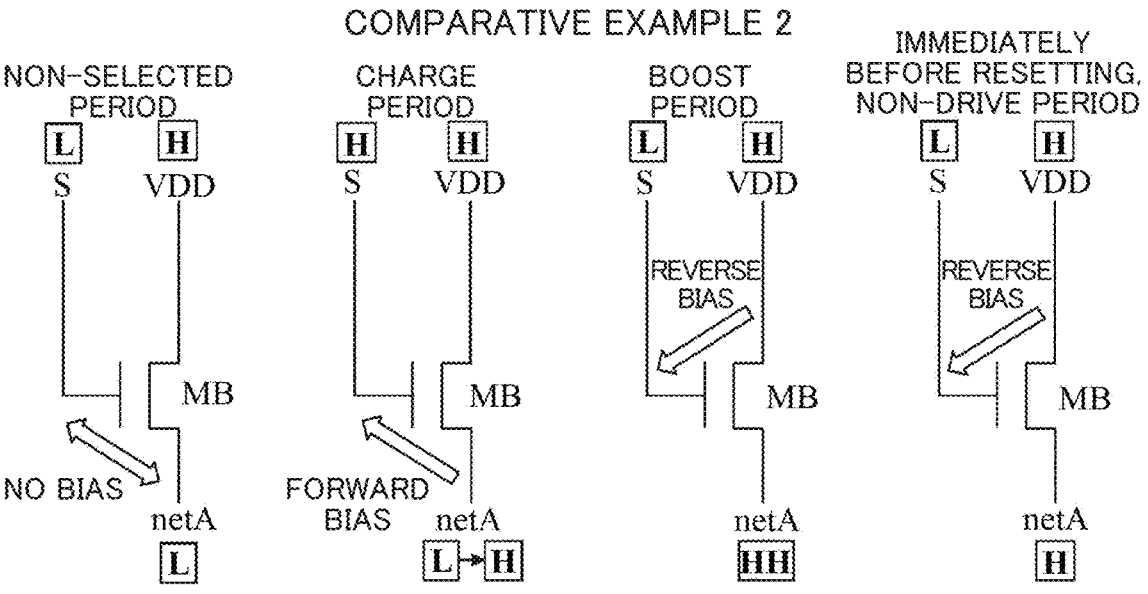
FIG. 15 is a diagram showing a relationship between the electrical potentials of the internal node netA and a SET signal S and the presence/absence of a bias in a non-selected period, in a charge period, in a boost period, immediately before resetting, and in the non-drive period T2 for a second transistor MB in a unit circuit SRB in accordance with Comparative Example 2.
Figure 16:
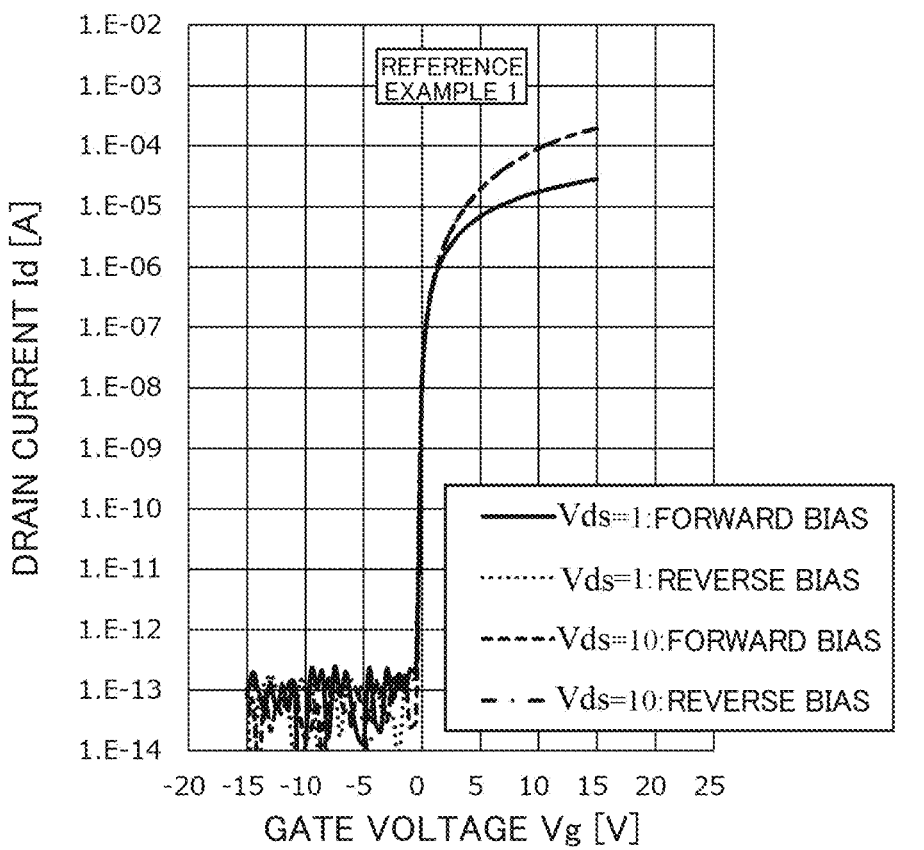
FIG. 16 is a graph representing a relationship between a gate voltage Vg and a drain current Id (gate voltage-drain current characteristics) in accordance with Reference Example 1.
Figure 17:
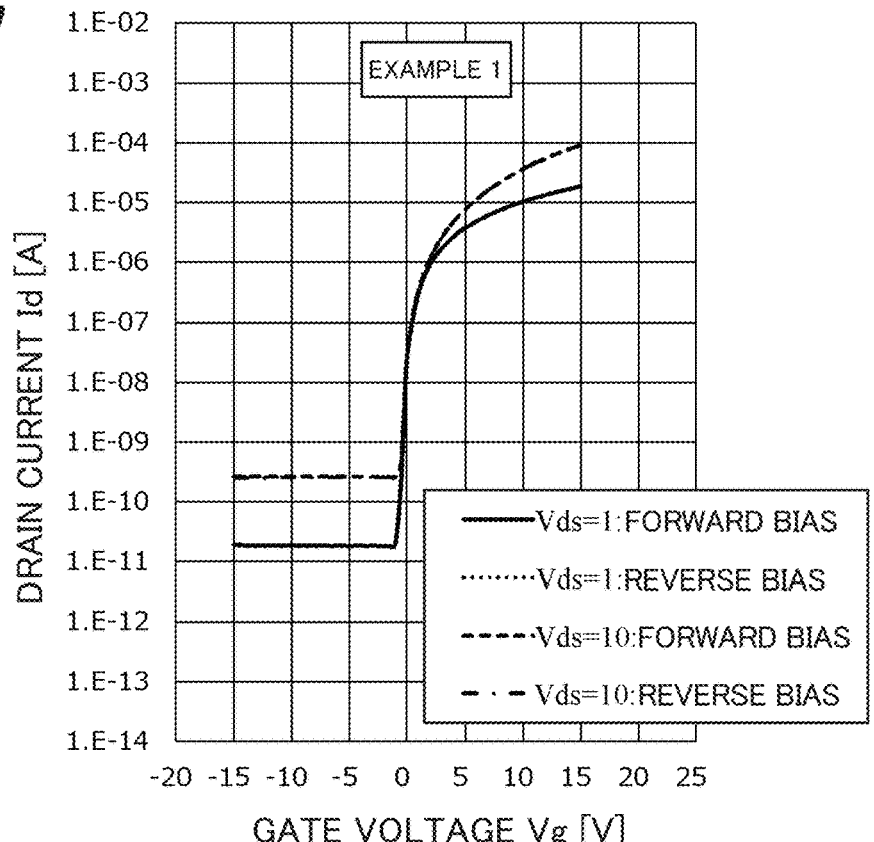
FIG. 17 is a graph representing a relationship between a gate voltage Vg and a drain current Id (gate voltage-drain current characteristics) in accordance with Example 1.
Figure 18:
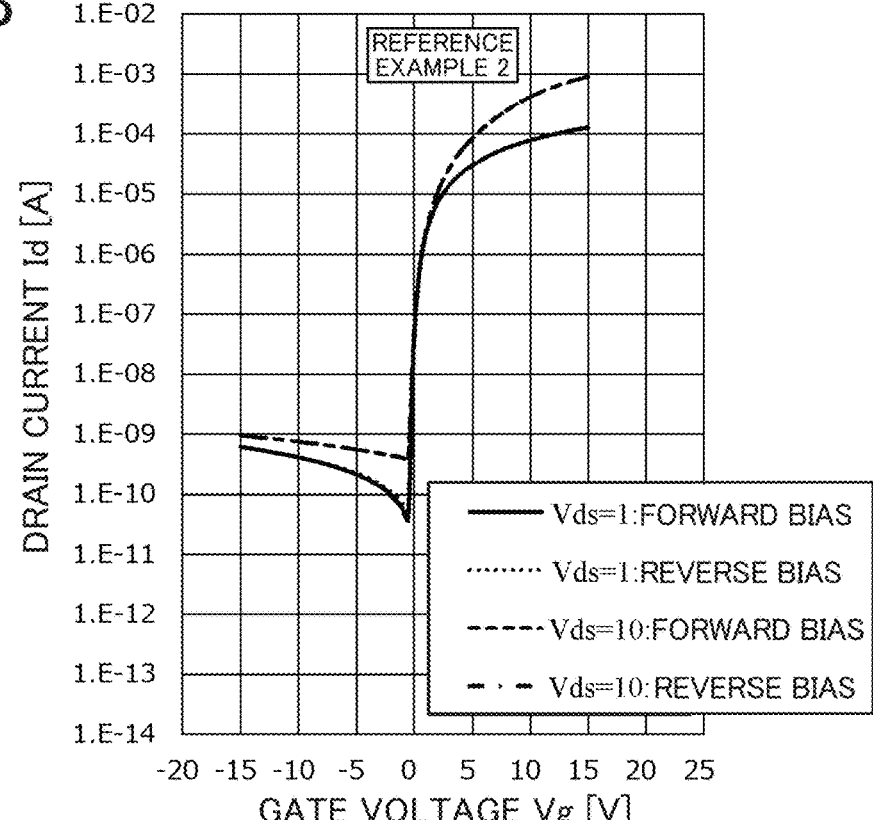
FIG. 18 is a graph representing a relationship between a gate voltage Vg and a drain current Id (gate voltage-drain current characteristics) in accordance with Reference Example 2.
Figure 19:
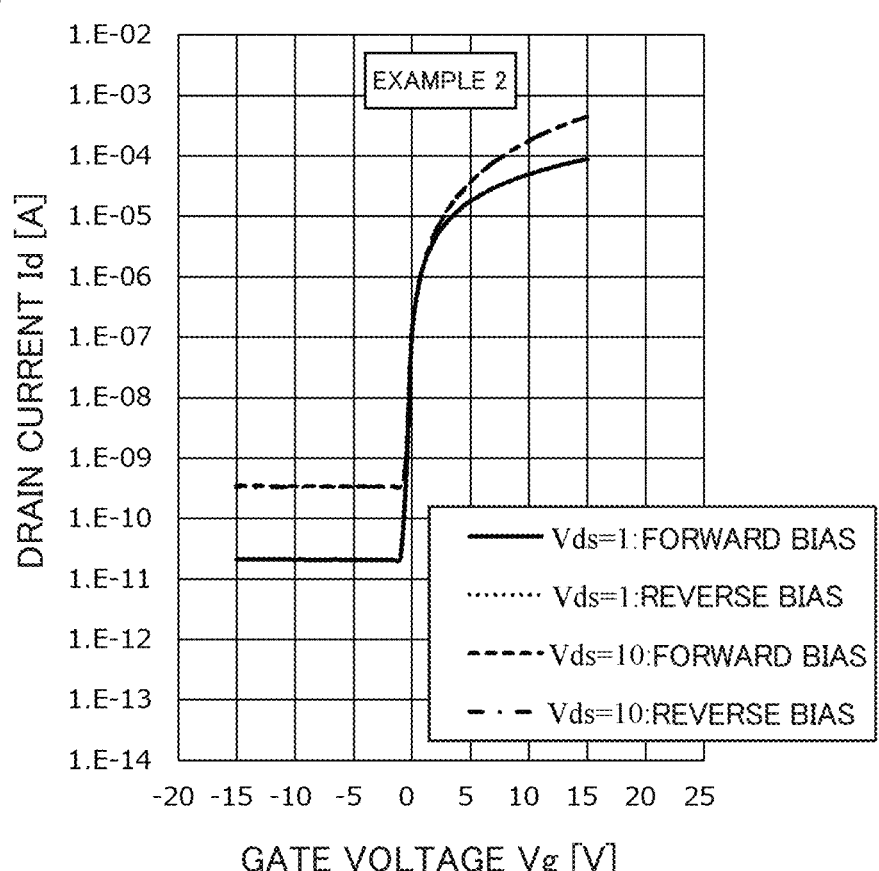
FIG. 19 is a graph representing a relationship between a gate voltage Vg and a drain current Id (gate voltage-drain current characteristics) in accordance with Example 2.

FIG. 15 is a diagram showing a relationship between the electrical potentials of the internal node netA and the SET signal S and the presence/absence of a bias in a non-selected period, in a charge (precharge) period, in a boost period, immediately before resetting, and in the non-drive period T2 for the second transistor MB in the unit circuit SRB in accordance with Comparative Example 2.

In the unit circuit SRB in accordance with Comparative Example 2, as shown in FIG. 15, the second transistor MB is placed under no bias in the non-selected period and is under a forward bias in the charge period. In contrast, the second transistor MB is placed under a reverse bias in the boost period, immediately before resetting, and in the non-drive period T2.

As described here, in the unit circuit SRB in accordance with Comparative Example 2, since there is a timing at which the second transistor MB is placed under a reverse bias, the threshold voltage of the second transistor MB shifts toward the negative end further under the influence of the light projected onto the second transistor MB from the rear side. The shift of the threshold voltage toward the negative end leads to increases in power consumption, and additionally, if the shift toward the negative end is excessive, the gate driver may not operate in a normal manner.

In contrast, in the unit circuit SR in the liquid crystal display device 100 in accordance with the present embodiment, the second transistor MB includes a lower gate electrode 12 that is electrically connected to the LOW power supply line VSS and that is fed with the LOW power supply potential VSS (may be described as being a gate-OFF electrical potential Vgl). Hence, the threshold voltage of the second transistor MB can be increased, and the resistance to the shift toward the negative end can be improved. It is therefore possible to, for example, restrain increases in power consumption and prevent lighting failures due to malfunction of the gate driver 40.

Note that the specific structure of each unit circuit SR is not necessarily limited to the example shown in FIG. 7. For example, each unit circuit SR may include four or more TFTs and may include two or more capacitors.

Verification of the Effects

A second transistor MB was fabricated that included an oxide semiconductor layer made of an In—Ga—Zn—O-based semiconductor to verify the effects of the lower gate electrode 12 being electrically connected to the LOW power supply line VSS (i.e., being fed with the LOW power supply potential VSS). The following will describe results of the verification.

The verification was performed on specifications where the channel width W was 10 μm and the channel length was 5 μm ("specification set A") and specifications where the channel width W was 50 μm and the channel length was 5 μm ("specification set B"). Specification set A is referred to as "Example 1" when the LOW power supply potential VSS is fed to the lower gate electrode 12, and specification set B is referred to as "Example 2" when the LOW power supply potential VSS is fed to the lower gate electrode 12. The LOW power supply potential VSS was specifically-15 V. In addition, specification set A is referred to as "Reference Example 1" when the lower gate electrode 12 is fed with the same electrical potential as is the upper gate electrode 16, and specification set B is referred to as "Reference Example 2" when the lower gate electrode 12 is fed with the same electrical potential as is the upper gate electrode 16.

A threshold voltage Vth was measured in Examples 1 and 2 and in Reference Examples 1 and 2. The source-drain voltage Vds was 1 V and 10 V. Table 1 and FIGS. 16 to 19 show results of the measurement. FIGS. 16 to 19 are graphs representing a relationship between a gate voltage Vg and a drain current Id (gate voltage-drain current characteristics).

TABLE 1

| Threshold Voltage Vth [V] | | Specification Set A (W = 10 µm, L = 5 µm) | | Specification Set B (W = 50 µm, L = 5 µm) | |
|---|---|---|---|---|---|
| | | Reference Example 1 | Example 1 | Reference Example 2 | Example 2 |
| Vds = 1 V | Forward | 2.33 | 4.17 | 2.31 | 4.18 |
| | Reverse | 2.26 | 4.12 | 2.34 | 4.12 |
| Vds = 10 V | Forward | 0.78 | 1.45 | 1.01 | 1.59 |
| | Reverse | 0.76 | 1.40 | 1.00 | 1.51 |

Table 1 and FIGS. 16 to 19 show that the threshold voltage Vth was higher in Example 1 than in Reference Example 1 and that the threshold voltage Vth was higher in Example 2 than in Reference Example 2. As described here, it was verified that the threshold voltage Vth of the second transistor MB could be increased by electrically connecting the lower gate electrode 12 to the LOW power supply line VSS.

Structures of First Transistor and Third Transistor

Figure 20:
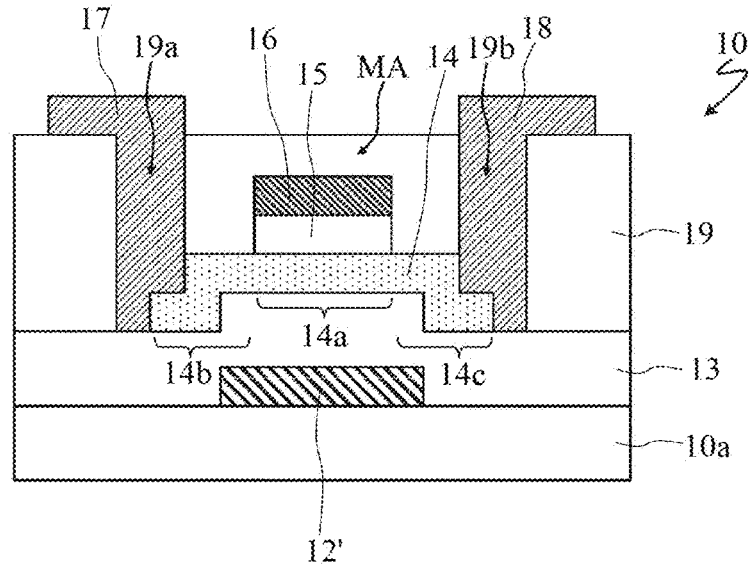
FIG. 20 is a schematic cross-sectional view of a region of the TFT substrate 10 in which there is provided a first transistor MA.
Figure 21:
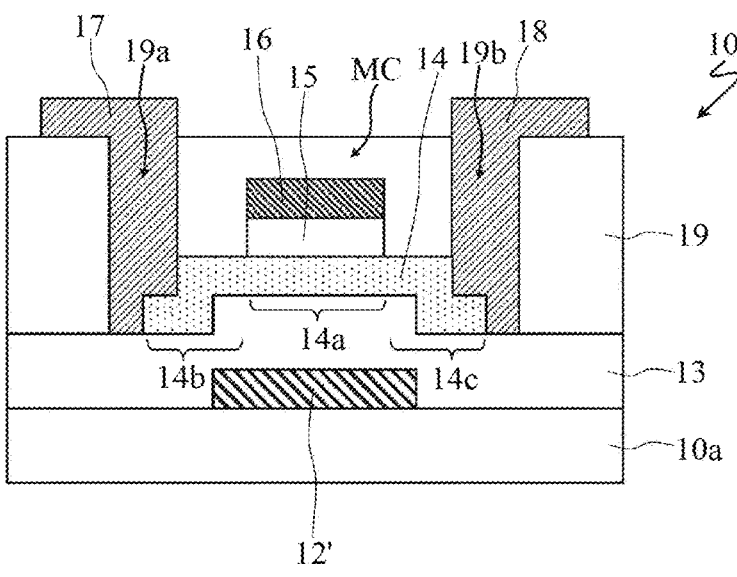
FIG. 21 is a schematic cross-sectional view of a region of the TFT substrate 10 in which there is provided a third transistor MC.

A description is now given of exemplary structures of the first transistor MA and the third transistor MC. FIG. 20 is a schematic cross-sectional view of a region of the TFT substrate 10 in which the first transistor MA is provided. FIG. 21 is a schematic cross-sectional view of a region of the TFT substrate 10 in which the third transistor MC is provided.

Referring to FIGS. 20 and 21, similarly to the second transistor MB, the first transistor MA and the third transistor MC each include an oxide semiconductor layer 14, a gate insulating layer 15, an upper gate electrode 16, a source electrode 17, and a drain electrode 18.

Below the oxide semiconductor layer 14 in the first transistor MA and the third transistor MC is there provided a light-blocking layer 12' that faces the channel region 14a across the lower insulating layer 13. The light-blocking layers 12', provided correspondingly to the first transistor MA and the third transistor MC, may be either electrically floating or fed with a prescribed electrical potential to function as a lower gate electrode. When the light-blocking layer 12' functions as a lower gate electrode, the light-blocking layer 12' is fed with, for example, the same electrical potential as is the upper gate electrode 16.

Oxide Semiconductor

The oxide semiconductor contained in the oxide semiconductor layer of each TFT in the present embodiment (alternatively referred to as the metal oxide or the oxide material) may be either an amorphous oxide semiconductor or a crystalline oxide semiconductor with a crystalline part. Examples of the crystalline oxide semiconductor include polycrystalline oxide semiconductors, microcrystalline oxide semiconductors, and crystalline oxide semiconductors with a c-axis oriented substantially perpendicular to the layer plane.

The oxide semiconductor layer may have a layered structure including two or more layers. When the oxide semiconductor layer has a layered structure, the oxide semiconductor layer may include an amorphous oxide semiconductor layer and a crystalline oxide semiconductor layer. Alternatively, the oxide semiconductor layer may include a plurality of crystalline oxide semiconductor layers that have different crystal structures. As another alternative, the oxide semiconductor layer may include a plurality of amorphous oxide semiconductor layers. When the oxide semiconductor layer has a two-layered structure including an upper layer and a lower layer, the oxide semiconductor contained in one of the two layers that is positioned on the gate electrode side (the lower layer in a bottom-gate structure; the upper layer in a top-gate structure) may have an energy gap that is smaller than the energy gap of the oxide semiconductor contained in one of the two layers that is positioned opposite the gate electrode (the upper layer in a bottom-gate structure; the lower layer in a top-gate structure). It should be understood however that when these layers have a relatively small energy gap difference, the oxide semiconductor in the layer positioned on the gate electrode side may have an energy gap that is larger than the energy gap of the oxide semiconductor in the layer positioned opposite the gate electrode.

See, for example, Japanese Unexamined Patent Application Publication No. 2014-007399, for example, for the composition, structure, and film formation method of an amorphous oxide semiconductor and each of the crystalline oxide semiconductors and also for the arrangement of the oxide semiconductor layer that has a layered structure. For reference purposes, this specification incorporates Japanese Unexamined Patent Application Publication No. 2014-007399 in its entirety by reference.

The oxide semiconductor layer may contain, for example, at least one of metal elements, In, Ga, and Zn. In the present embodiment, the oxide semiconductor layer contains, for example, an In—Ga—Zn—O-based semiconductor (e.g., an indium gallium zinc oxide). Here, the In—Ga—Zn—O-based semiconductor is a ternary oxide of In (indium), Ga (gallium), and Zn (zinc) and has a ratio of In, Ga, and Zn (composition ratio) that is not limited in any particular manner; the ratio may be, for example, In:Ga:Zn=2:2:1, In:Ga:Zn=1:1:1, and In:Ga:Zn=1:1:2. This oxide semiconductor layer may be fabricated from an oxide semiconductor film containing an In—Ga—Zn—O-based semiconductor.

The In—Ga—Zn—O-based semiconductor may be either amorphous or crystalline. The crystalline In—Ga—Zn—O-based semiconductor is preferably an In—Ga—Zn—O-based crystalline semiconductor with a c-axis oriented substantially perpendicular to the layer plane.

Note that the crystal structures of In—Ga—Zn—O-based crystalline semiconductors are disclosed, for example, in Japanese Unexamined Patent Application Publication No. 2014-007399, Japanese Unexamined Patent Application Publication No. 2012-134475, and Japanese Unexamined Patent Application Publication No. 2014-209727 described above. For reference purposes, this specification incorporates Japanese Unexamined Patent Application Publication No. 2012-134475 and Japanese Unexamined Patent Application Publication No. 2014-209727 in their entirety by reference. Since TFTs with an In—Ga—Zn—O-based semiconductor layer have a high mobility (higher than 20 times the mobility of a-SiTFTs) and a low leakage current (lower than $\frac{1}{100}$ times the leakage current of a-SiTFTs), these TFTs are suitably used as drive TFTs (e.g., TFTs included in a drive circuit provided on the periphery of the display area where there are provided a plurality of pixels on the same substrate as the display area) and pixel TFTs (TFTs in pixels).

The oxide semiconductor layer may contain an oxide semiconductor other than In—Ga—Zn—O-based semiconductor. The oxide semiconductor layer may contain, for example, an In—Sn—Zn—O-based semiconductor (e.g., $In_2O_3$—$SnO_2$—ZnO;InSnZnO). The In—Sn—Zn—O- based semiconductor is a ternary oxide of In (indium), Sn (tin), and Zn (zinc). Alternatively, the oxide semiconductor layer may contain, for example, an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, CdO (cadmium oxide), a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, an In—Ga—Zn—Sn—O-based semiconductor, and an In—W—Zn—O-based semiconductor.

INDUSTRIAL APPLICABILITY

The present invention, in an embodiment thereof, enables providing a display device that includes a GDM circuit including oxide semiconductor TFTs and that can be suitably used as an in-cell-type touch panel.

What is claimed is:
1. A display device comprising:
a display panel including a plurality of scan signal lines; and
a scan signal line drive circuit configured to drive the plurality of scan signal lines, wherein:
the scan signal line drive circuit is capable of alternately switching, in one vertical scan period, between a drive period, in which the plurality of scan signal lines is sequentially turned into a selected state, and a non-drive period, in which the plurality of scan signal lines is not driven,
the display panel further includes a HIGH power supply line and a LOW power supply line,
the scan signal line drive circuit includes a shift register circuit including a plurality of stages,
a unit circuit in each of the plurality of stages includes:
a clock terminal to which a clock signal is inputted,
a SET terminal to which a SET signal is inputted,
a RESET terminal to which a RESET signal is inputted,
an output terminal electrically connected to a corresponding one of the plurality of scan signal lines to output a scan signal,
a first thin film transistor including a first semiconductor layer, a first gate electrode, a first source electrode, and a first drain electrode, the first gate electrode being electrically connected to an internal node, one of the first source electrode and the first drain electrode being electrically connected to the clock terminal, and another one of the first source electrode and the first drain electrode being electrically connected to the output terminal,
a second thin film transistor including a second semiconductor layer, a second gate electrode, a second source electrode, and a second drain electrode, the second gate electrode being electrically connected to the SET terminal, and one of the second source electrode and the second drain electrode being electrically connected to the internal node, and
a third thin film transistor including a third semiconductor layer, a third gate electrode, a third source electrode, and a third drain electrode, the third gate electrode being electrically connected to the RESET terminal, and one of the third source electrode and the third drain electrode being electrically connected to the internal node,
the second gate electrode of the second thin film transistor is an upper gate electrode disposed above the second semiconductor layer via a gate insulating layer,
another one of the second source electrode and the second drain electrode of the second thin film transistor is electrically connected to the HIGH power supply line, and
the second thin film transistor further includes a lower gate electrode disposed below the second semiconductor layer, facing a channel region of the second semiconductor layer across a lower insulating layer, and electrically connected to the LOW power supply line, and
a control signal is applied to another one of the third source electrode and the third drain electrode of the third thin film transistor, the control signal having a first electrical potential lower than a threshold voltage of the first thin film transistor in the drive period and having a second electrical potential higher than the first electrical potential in at least a part of the non-drive period.
2. The display device according to claim 1, wherein
the unit circuit further includes a capacitor including a pair of electrodes,
one of the pair of electrodes is electrically connected to the internal node, and
another one of the pair of electrodes is electrically connected to the output terminal.
3. The display device according to claim 1, wherein the display panel further includes:
a plurality of electrodes used by a touch sensor, wherein a plurality of mutually different signals is applicable to the plurality of electrodes; and
a plurality of wires used by the touch sensor, wherein each of the plurality of wires is electrically connected to a corresponding one of the plurality of electrodes,
wherein the touch sensor is driven during the non-drive period.
4. The display device according to claim 1, wherein
the display panel includes an active matrix substrate including the plurality of scan signal lines, and
the scan signal line drive circuit is formed monolithically on the active matrix substrate.
5. The display device according to claim 1, wherein each of the first semiconductor layer, the second semiconductor layer, and the third semiconductor layer is an oxide semiconductor layer.
6. The display device according to claim 5, wherein the oxide semiconductor layer contains an In—Ga—Zn—O-based semiconductor.

* * * * *